(12) United States Patent
Cameron et al.

(10) Patent No.: US 12,475,606 B2
(45) Date of Patent: Nov. 18, 2025

(54) CONTENT GENERATION SYSTEM AND METHOD

(71) Applicant: Sony Interactive Entertainment Inc., Tokyo (JP)

(72) Inventors: Matthew Cameron, London (GB); Pedro Leyton Quijada, London (GB); Jason Craig Millson, London (GB); Max Ashton, Manchester (GB); David Erwan Damien Uberti, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 43 days.

(21) Appl. No.: 17/632,851

(22) PCT Filed: Jul. 8, 2020

(86) PCT No.: PCT/GB2020/051644
§ 371 (c)(1),
(2) Date: Feb. 4, 2022

(87) PCT Pub. No.: WO2021/023964
PCT Pub. Date: Feb. 11, 2021

(65) Prior Publication Data
US 2022/0277493 A1 Sep. 1, 2022

(30) Foreign Application Priority Data

Aug. 7, 2019 (GB) .................................. 1911313

(51) Int. Cl.
*G02B 27/01* (2006.01)
*G06F 3/01* (2006.01)
(Continued)

(52) U.S. Cl.
CPC ............ *G06T 11/00* (2013.01); *G02B 27/017* (2013.01); *G06F 3/011* (2013.01); *G06F 3/1423* (2013.01);
(Continued)

(58) Field of Classification Search
CPC ............... G06F 2111/18; G06F 3/0481; G06F 3/04817; G06F 9/4443; G06F 3/04847;
(Continued)

(56) References Cited

U.S. PATENT DOCUMENTS 10,078,917 B1 9/2018 Gaeta
10,620,902 B2 * 4/2020 Ashbrook ............ G06Q 10/101
(Continued)

FOREIGN PATENT DOCUMENTS

EP 2627420 B1 8/2013
EP 4010096 A1 6/2022
GB 2586148 A 2/2021

OTHER PUBLICATIONS

International Search Report and Written Opinion for corresponding PCT Application No. PCT/GB2020/051644, 14 pages, dated Oct. 9, 2020.
(Continued)

*Primary Examiner* — Matthew Salvucci
(74) *Attorney, Agent, or Firm* — Kilpatrick Townsend & Stockton LLP (57) ABSTRACT

A system for generating secondary content for display, the secondary content being augmented reality content corresponding to primary content for display by a first display device, the system including a primary content characterisation unit operable to characterise the primary content, a secondary content generation unit operable to generate, in dependence upon the characterisation of the primary content, secondary content including one or more secondary
(Continued)

content elements associated with the primary content, and a content positioning unit operable to position one or more secondary content elements with respect to one or more elements in a real environment, where the user of a second display device is able to view the secondary content elements overlaid upon a view of the real environment at the respective specified positions.

14 Claims, 6 Drawing Sheets

(51) Int. Cl.
    *G06F 3/14*         (2006.01)
    *G06T 11/00*       (2006.01)
    *G09B 21/00*       (2006.01)

(52) U.S. Cl.
    CPC ........ *G02B 2027/014* (2013.01); *G09B 21/00* (2013.01)

(58) Field of Classification Search
    CPC .... G06F 11/3664; G06F 3/012; G06F 3/0304; G06F 3/011–015; G06F 3/1423; G06V 20/20; G06T 19/00; G06T 17/00; G06T 7/00; G06T 19/006; G06T 2215/16; H04N 5/272; H04N 2201/3245; A63F 13/10; G02B 27/017; G02B 2027/014; G09B 21/00
    See application file for complete search history.

(56) References Cited

U.S. PATENT DOCUMENTS

| | | |
|---|---|---|
| 2013/0249947 A1 | 9/2013 | Reitan |
| 2018/0224929 A1 | 8/2018 | Mullen |
| 2018/0255285 A1 | 9/2018 | Hall |
| 2019/0007750 A1* | 1/2019 | Tillman, Jr. ............ G06F 3/011 |
| 2019/0104235 A1* | 4/2019 | Sarkar .................... H04N 5/272 |
| 2020/0027314 A1* | 1/2020 | Pilnock ............... G07F 17/3223 |
| 2022/0277493 A1 | 9/2022 | Cameron |

OTHER PUBLICATIONS

Combined Search and Examination Report for corresponding GB Application 1911313.3, 8 pages, dated Jan. 31, 2020.
Communication pursuant to Article 94(3) EPC, for corresponding EP Application No. 20742385.6, 5 pages, dated Jan. 24, 2023.
Communication pursuant to Article 94(3) EPC, for corresponding EP Application No. 20742385.6, 5 pages, dated Aug. 8, 2023.
Examination Report under Section 18(3) for corresponding GB Application No. 1911313.3, 4 pages, dated Nov. 15, 2023.
Examination Report under Section 18(3) for corresponding GB Application No. 1911313.3, 4 pages, dated Feb. 1, 2024.
Razer Rex, "[VR] Gob Battle Experience I Hypever Aka RaZeRRex Battle of Guns of boom", You Tube, https://www.youtube.com/watch?v=4zpE6kAmvl8, 1 page, Oct. 2, 2017 (For relevancy see Non-Pat. Lit. #1).
AR Critic, "Gun of Boom AR Spectator Mode Released" https://arcritic. com/ 400/ gun-of-boom-ar -spectator -mode-released/, 1 page, Oct. 2, 2017 (For relevancy see Non-Pat. Lit. #1).
Examination Report under Section 18(3) for corresponding GB Application No. 1911313.3, 4 pages, dated Jan. 9, 2024.
EP Application No. 20 742385.6, Examination Report (Communication pursuant to Article 94(3) EPC, Oct. 21, 2024, 5 pages.

\* cited by examiner

CONTENT GENERATION SYSTEM AND METHOD

BACKGROUND

This disclosure relates to content generation systems and methods.

In recent years, it has become increasingly common for video game and other content to be provided using virtual reality (VR) based display arrangements. This is often seen as desirable as it can lead to a more immersive interactive experience for users, which may increase the user's enjoyment of the content. While this increase has in part been driven by improvements in the available hardware to provide such content, such as improved displays and increasingly powerful processing elements, a number of aspects of the virtual reality experience remain unsatisfactory.

One such drawback is that of the limited social interactions that are available alongside the virtual reality content; often, only a single user is able to wear a head-mountable display unit (HMD) in a group of gamers and as a result only this user may be able to view the content that is displayed. This may result in a significant disparity between the user experience of the main user (that is, the wearer of the HMD) and that of any secondary users (those not wearing the HMD). In such cases, the experience of the secondary users may be substantially worse than that of the main user.

Of course, one solution to such a problem is to provide multi-user VR arrangements. However this can result in a number of other problems being raised; not least that of providing an entertainment device that is capable of supporting image rendering for multiple HMDs simultaneously. For example, user interactions in a virtual environment may be difficult to implement, or result in a break in immersion, for example due to the use of avatars to represent the users.

An alternative solution that has been proposed is that of a spectator screen in which the view that is provided to the HMD user is also displayed on a secondary display device, such as a television, so that it can be viewed by the secondary users. This can help in bridging the gap between the respective user experiences, as the secondary users are able to spectate the action of the main user—and as a result may be able to offer advice to the main user, or simply enjoy viewing the content.

However, second-hand experience of the content may not be particularly enjoyable in some cases—viewing another person's gameplay may lack a level of interactivity that is suitable to engage a viewer's attention, for example, and the fact that the view of the spectators is constrained to that of the main user may cause a sense of frustration.

SUMMARY

It is therefore apparent that an improved spectator experience for provision alongside VR content is desirable.

It is in the context of the above problems that the present disclosure arises.

This disclosure is defined by claim 1.

Further respective aspects and features of the disclosure are defined in the appended claims.

BRIEF DESCRIPTION OF THE DRAWING

Embodiments of the present invention will now be described by way of example with reference to the accompanying drawings, in which.

DETAILED DESCRIPTION

While embodiments of the present disclosure are primarily discussed below in the context of providing an improved viewing experience alongside VR content, it should be understood that this is not intended to be limiting. The methods described below may be equally applicable to any display method used to show the main content stream—for example, the improved viewing experience may be provided alongside content shown on a television, and may include any suitable video or video game content.

Figure 1:
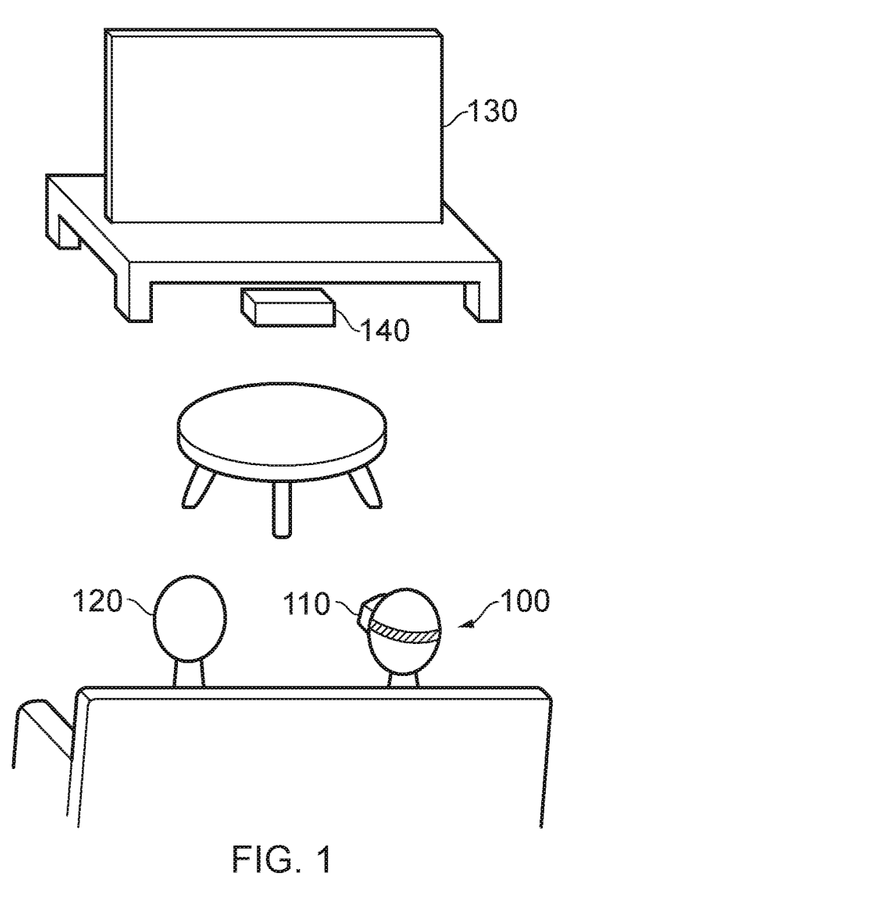
FIG. 1 schematically illustrates a content viewing environment.

FIG. 1 schematically illustrates an exemplary content viewing environment.

In this environment, a first viewer 100 is shown that is wearing an HMD 110; a second viewer 120 is not equipped with a second HMD. Instead, the second viewer 120 is able to view content only on the display 130. One or both of the display devices 110 and 130 may be provided with content generated by the processing device 140, which may for example be a games console or the like. Of course, any suitable combination of display devices and processing devices may be provided so as to generate content for viewing by each user 100 and 120.

As discussed above, the HMD 110 may be operable to display immersive content (such as virtual reality content) to the first viewer 100, while the second user 120 is not able to see this content at all. This can result in a rather unsatisfactory experience for the second user 120, as they do not get to experience the same content as the first user. While content may be provided to the second user 120 via the display 130, this may not be sufficient for the second user's 120 enjoyment if the content that is generated for display to the second user 120 is not considered to be suitably engaging.

For example, in previously proposed arrangements, the display 130 may be operable to provide the same content as shown by the HMD 110. This enables the second user 120 to be able to see the same content (potentially displayed differently, for example as a two dimensional image rather than a three dimensional image) as the first user 100; however this may not be particularly interesting to the second user 120, as there would be little immersion and they would not have control over the viewpoint.

Figure 2:
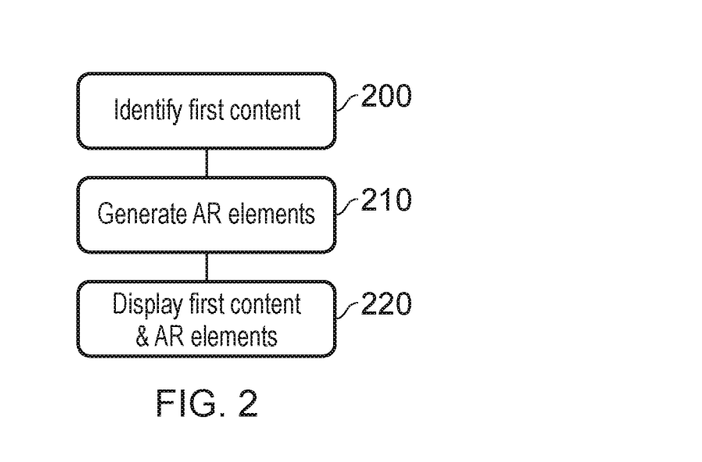
FIG. 2 schematically illustrates a content display method.

FIG. 2 schematically illustrates a content display method which is proposed to address such problems in the display of content.

At a step 200, an identification of the primary content is performed. Here, the 'primary content' refers to the main display content—for example, the VR content provided via an HMD for the first user. Identification of the content may comprise the performing of processing to identify any suitable aspects of the content—for example, the title of the content, the type of content (such as game or video), the genre of the content, and/or one or more display parameters for the content. This identification may be based upon an analysis of the content itself, and/or may comprise the analysis of metadata associated with the content.

At a step 210, augmented reality (AR) content elements are generated in dependence upon the identification of the primary content as performed in step 200. The AR content elements should be generated so as to be able to display relevant information and/or provide relevant interactivity for the second user (that is, a user that is not able to interact directly with the primary content or not able to view it directly). Examples of suitable AR elements are described below with reference to FIGS. 5-7. Once generated, the a user may be able to select from amongst the available AR elements and may be able to perform a positioning process so as to be able to locate one or more AR elements within the physical environment.

At a step 220, the primary content and selected AR content elements are displayed. While in some embodiments the display of the respective contents is entirely independent, in other embodiments the contents are display in dependence upon one another—for example, they may be displayed in synchronicity, or the display of one content element may be paused or otherwise modified in dependence upon the display of another of the contents.

For example, if the primary content corresponds to a view of an esports game as provided to a first user via an HMD, a number of AR elements may be provided. For instance, a mini-map may be provided that details the position of one or more players or elements within the game environment; this should of course be displayed in synchronicity with the primary content. However, replay content may also be provided as an AR element; this content should be updated in dependence upon an elapsed time within the primary content, but is not displayed in synchronicity. A further example of AR content is that of team information (such as which players/teams are taking part, and initial selection/loadout information), which is determined at the start of the game and therefore can be displayed alongside the primary content without any update required in dependence upon the elapsed time of the primary content.

Of course, the primary content need not relate to game content and may instead be any suitable video content and the AR elements are able to be selected as appropriate for enhancing such content. For instance, if the primary content were a wildlife documentary an AR element may be provided that provides a standalone visual representation of an animal present in the primary content (for example, so as to enable a user to rotate/zoom about the animal for a more detailed view from any angle) and/or information about the animal (such as normal habitat, diet, physical traits) may also be provided. The AR elements that may be appropriate for a particular instance of primary content may be determined freely.

Figure 3:
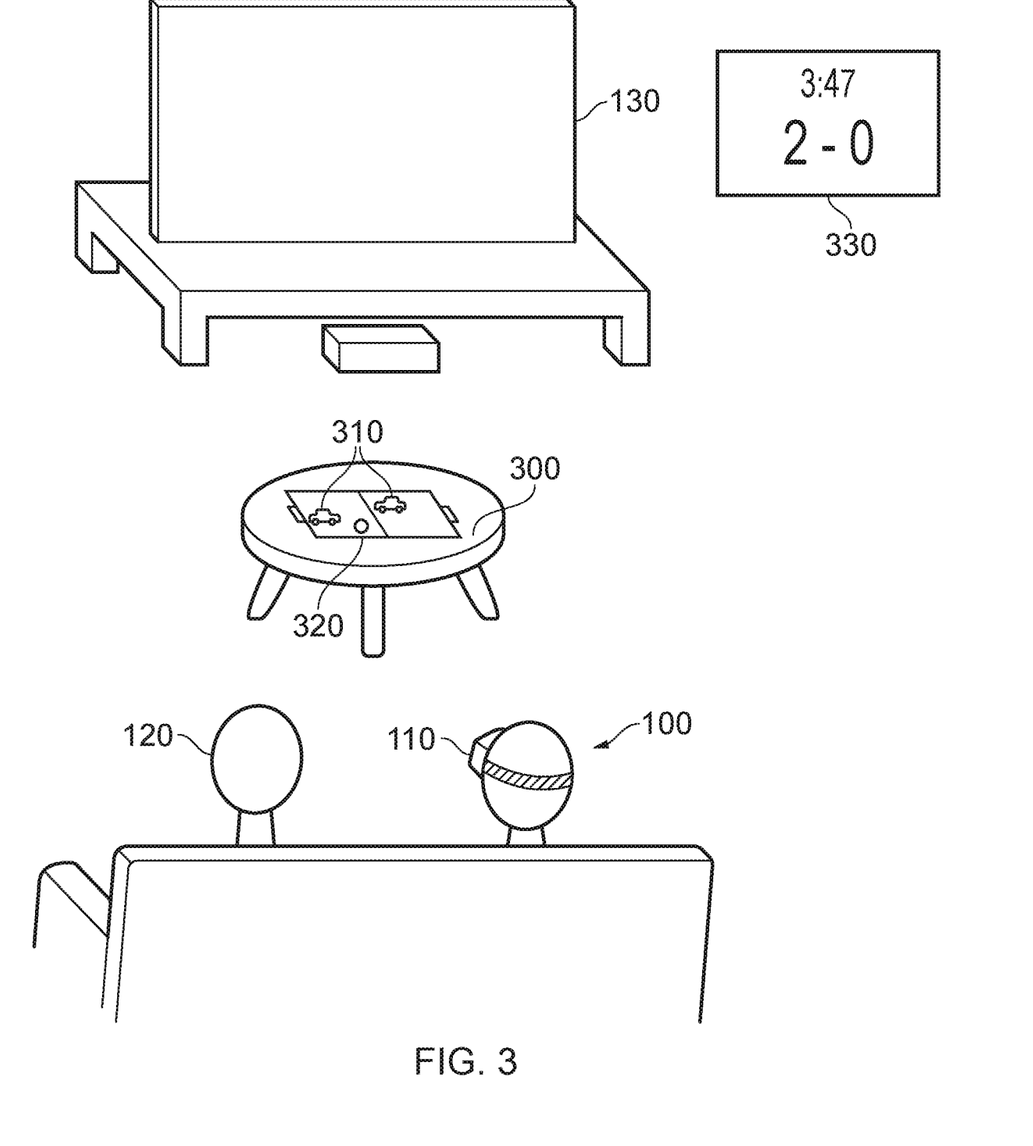
FIG. 3 schematically illustrates a content viewing environment.

FIG. 3 schematically illustrates an example of the result of such a method being employed with the display environment shown in FIG. 1.

In this example, the first user 100 is viewing content on the HMD 110 corresponding to an esports game; for example, this may comprise a first-person view of the action, or a curated selection of camera angles throughout the game so as to provide a detailed view of the action. As discussed above, the second user 120 may be provided with a view of the content on the display 130; however this may be a view that differs in image quality/immersiveness or the like.

It may therefore be considered advantageous that the user is able to be provided with AR elements that assist in conveying information about the current game state. These AR elements are represented in FIG. 3 by reference numerals 300, 310, 320, and 330. The second user 120 may be able to view these elements via a handheld device (such as a tablet or mobile phone), for example, which may be directed towards the position of the arena 300. A camera feed of that position may be obtained by the device, and the AR elements may be overlaid onto that camera feed as appropriate to generate an augmented reality view.

A view of the entire game arena (in this case, in a car-based football-style game) 300 is provided, and includes user-controlled elements (cars) 310 and a ball 320. These may be regarded as a single AR element, in some embodiments, or may be provided separately (for example, the relative positions of the cars 310 and the ball 320 may be considered to be of interest even in the absence of the area 300). The provision of this AR element (or elements) may be regarded as beneficial to the second user 120 in that they are provided with an overview of the action and as such may be provided with a different experience of the game to the first user 100; for example, a more detailed analysis of the tactics at play (or macro-game) may be enjoyed.

In addition to the representation of the action within the content shown to the user 100 via the HMD 110, additional information may be shown. In FIG. 3, this is exemplified by the scoreboard 330 which shows the current score and remaining time. Of course, any suitable information may be shown, and in any suitable format for that information. A selection of alternative or additional AR elements is discussed below.

The placement of these virtual AR elements within the real environment may be performed in any suitable manner. In some embodiments, one or more suitable locations for a particular AR element may be determined based upon an analysis of images captured of the environment—for example, so as to identify surfaces of a suitable size and/or orientation for the display of such information.

For example, the AR element 300/310/320 may be defined so as to require a substantially horizontal surface within the real environment that has an equal-to- or above-threshold area available (or minimum length/breadth requirements) to enable a suitably detailed display of information to the user. Similarly, the scoreboard 330 may be defined so as to require a particular-sized substantially vertical surface—wherein the font size may be selected to correspond to the size of the element, and/or a minimum font size may be defined (either as an absolute value, or in dependence upon an expected distance of the AR element from the user).

The selection of a display location from amongst the detected suitable candidate locations may be performed automatically, or in response to a user indication of a preferred one or more of those locations.

Alternatively, or in addition, a user may be able to exert a greater control over the AR element placement process. For example, a user may be able to select an element and resize/reorient it as desired, and to place the AR elements at a location within the real environment at any location. These locations may be constrained by suitability, for example to avoid clashing with other real or virtual objects/elements, or may be entirely freely selected.

The provision of such AR elements may be advantageous in enabling a greater interaction between the users (for example, the second user 120 may be able to provide additional information to the user 100). In this manner, multiple users may be able to be provided with an immersive and enjoyable experience without the requirement of a large amount of processing power as would be necessitated by the provision of a multi-user VR application.

In the case that the primary content corresponds to live game action for a game being played by the first user, this may enable a team or otherwise multiplayer experience in which the AR elements may be used to provide information to a second user such that they are able to provide advice or other feedback to the first user.

Figure 4:
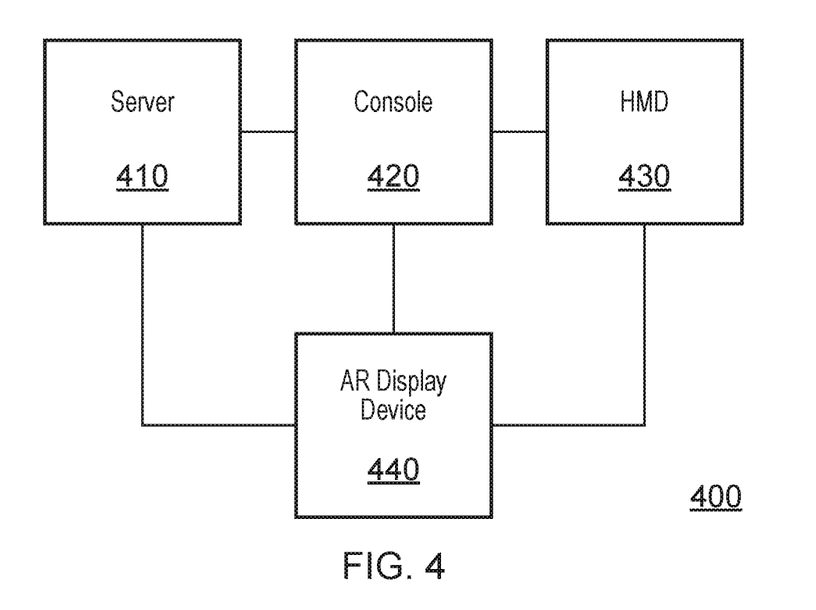
FIG. 4 schematically illustrates a content generation and display system.

FIG. 4 schematically illustrates an exemplary arrangement 400 for implementing such a content generation and display method. The arrangement 400 comprises a server 410, console 420, HMD 430 and AR display device 440. Of course, the arrangement 400 may be modified as appropriate; for example, no server may be included where the display is implemented entirely locally, and multiple display devices 430/440 or consoles 420 may be provided.

The server 410 is operable to communicate with any or all of the devices 420/430/440 as appropriate; for example, this communication may be performed via a network such as the internet. The server 410 my be operable to generate and/or communicate any suitable information to one or more of the devices; for example, the server 410 may be operable to host cloud gaming sessions or to provide video streams as the content to be displayed by the HMD 430. The server 410 may also be operable to generate the AR content for view by the AR display device 440, and/or provide information to enable an update of the displayed AR content (such as live score information, or information about the in-game events).

The console 420 is an example of a suitable processing device for use in the content generation and display process; of course, any other suitable processing device could be used instead (or in addition). Examples of such devices may include personal computers or mobile phones. The console 420 may be operable to provide any suitable functions of the server 410 as described above, for example, such as content generation and/or image rendering.

Of course, in some embodiments (such as those in which the content is obtained via cloud gaming or online streaming) the console 420 may be omitted entirely, and each display device 430/440 may be able to communicate with the server 410 directly. In these cases, the processing that would normally be performed by an intermediate device such as the console 420 is instead able to be performed at either or both of the server 410 and the displays 430/440.

The HMD 430 is a display device that is operable to display the primary content. As noted above, in some cases this content may be displayed via a display other than an HMD; the use of an HMD in this Figure is considered entirely exemplary. That is to say, the advantages associated with the provision of AR content to accompany the primary content may be enjoyed regardless of the primary display method—even if the display 130 in FIG. 3 were used to display the primary content, the second user 120 may wish to view the AR content 300 and the like.

The AR display device 440 may take any suitable form in view of the primary function of being able to display the AR content to the user of the display device 440. Examples of suitable devices include AR headsets (such as glasses-style arrangements), mobile phones, tablet computers, and/or projectors. Each of these devices may allow the user to see the real environment (either directly, or via a camera image feed) in addition to one or more virtual elements that are displayed.

In some embodiments, the AR display device 440 (or another element, such as a camera associated with the console 420) may be operable to capture user inputs (such as gestures or other inputs) to enable an interaction with the displayed AR elements. For example, the user 120 may be able to perform an action that causes the AR element shown in FIG. 3 to zoom in so as to focus on a particular portion of the arena 300, or to rotate the arena 300. Examples of such interactions are described below.

Figure 5:
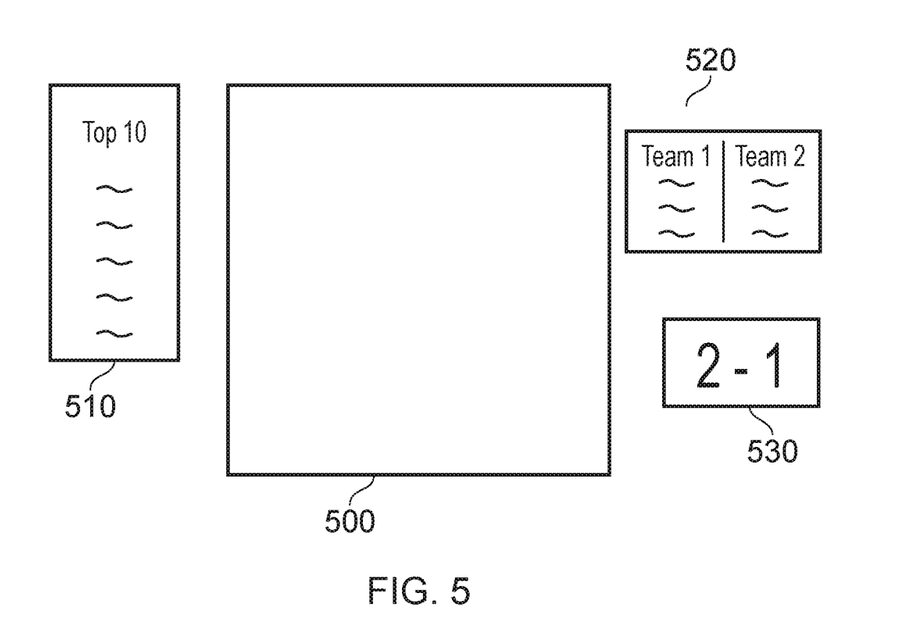
FIG. 5 schematically illustrates a selection of AR elements.
Figure 6:
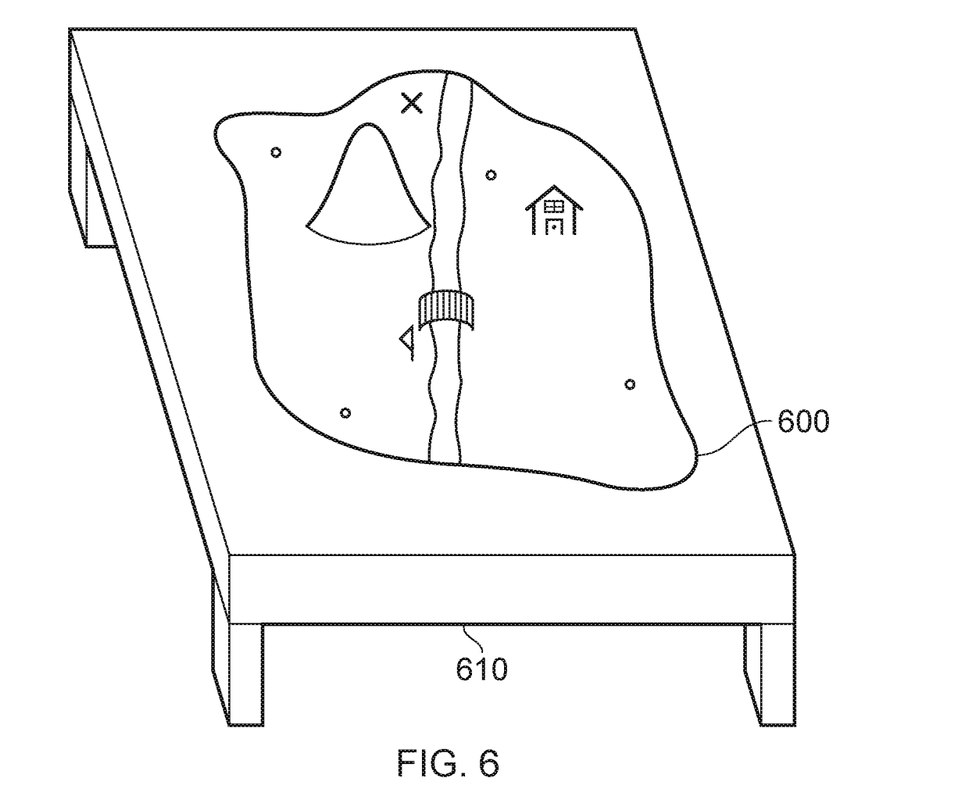
FIG. 6 schematically illustrates an AR element.
Figure 7:
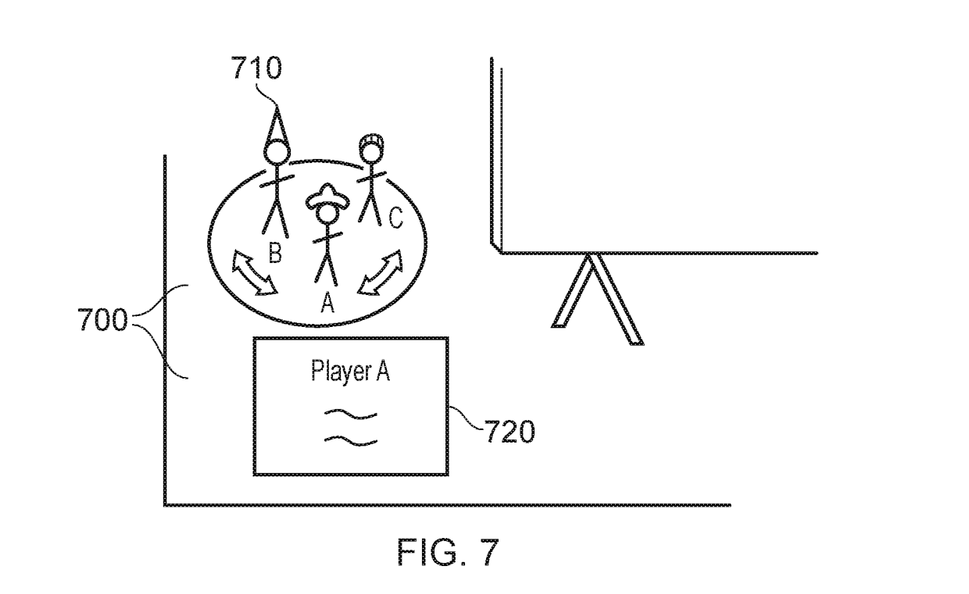
FIG. 7 schematically illustrates an interactive AR element.

FIGS. 5-7 each schematically illustrate examples of AR elements that may be displayed to a user of an AR display device, along with an example of a suitable location for such an element to be displayed. Of course, these examples and combinations of AR elements and locations are intended only to be illustrative, and not limiting.

FIG. 5 illustrates an example in which AR elements 510, 520, and 530 are displayed surrounding a display 500. The display 500 may be configured to show the primary content, for example, or a modified version as discussed above. In some cases, the primary content may be displayed by the AR display device so as to overlap the display device 500—this may reduce the number of display devices used to display content, for example.

The AR element 510 comprises a scoreboard of the top 10 performers relating to the content—for example, the ten top-ranked teams within a game that is being played/shown. This may be an example of an AR element that relates to the content itself, rather than the events shown in the content—that is, the AR element 510 may not name any of the teams or players that are within the currently shown/played game.

The AR element 520 may comprise information that is static throughout the game/content; for example, a list of the players corresponding to each team within a game. Alternatively, this information may be semi-static; for instance, player names could be greyed out if a player is eliminated.

The AR element 530 is an example of an AR element that directly reports information relating to the game; in this case, a live score. This may be a score within the game (such as the number of goals scored in a particular game), or the number of games won in a multi-game series, for example. Of course, in some cases both of these may be displayed.

Each of these AR elements are suitable for display on any flat, or substantially flat, surface—for example, a table or wall may be appropriate. While a vertical surface may be preferred, a horizontal surface may also be suitable. The AR elements may be rearranged as appropriate or as desired by the viewer; for instance, a 'drag and drop' action may be performed on a mobile phone screen to rearrange the elements, or other gesture-based or controller-based inputs may be provided.

FIG. 6 schematically illustrates an AR element 600 that is positioned on a table 610. In some embodiments, the AR element 600 is positioned using absolute coordinates for the room, for example, such that the position is maintained even if the environment changes. Alternatively, the position of the AR element 600 may be indicated with reference to the table 610 or the surface of the table 610; in such embodiments, the element 600 would be configured so as to move with the table 610 (for example, if a user moves the table to a different location) so as to maintain it's display position relative to the table 610 surface.

The AR element 600 may represent the map of a game that is being played or viewed, or at least a portion of the map. The map may comprise two- or three-dimensional representations of one or more geographical features of the environment (such as a mountain and a river) as well as interactive elements or locations (such as a bridge and a house). Player positions may also be denoted (such as by the dots on the map), as well as objectives or key locations (the flag and the cross).

The user may be able to interact with this AR element 600, for example as discussed above with reference to FIG. 3. These interactions may comprise rotations or zooming of the displayed map, and a modification of the elements that are displayed. For instance, the map may be modified such that certain elements or classes of elements (such as a particular mountain, or players below a threshold score) are omitted from the element 600; similarly, the display of the elements may be modified (such as a selection of a two-dimensional representation of natural features in preference to a three-dimensional representation). The user may also be able to select preferred icons or colours for particular elements.

A further example of a possible interaction may be the selection of an element to display further information about that element. For example, when selecting an element information may be displayed relating to the remaining hit points or durability of the element; of course, any suitable information may be considered appropriate for display. The display of information may be provided as a part of the element 600 (for example, as a pop up) or as a part of an associated element (such as an information panel alongside the element 600), or as a part of another existing element (such as an element shown in FIG. 5, which appears in a location entirely separate to the element 600).

FIG. 7 schematically illustrates an AR element 700 which is provided primarily for the purpose of user interaction. The element 700 is provided alongside a display, such as the display 130 of FIG. 3, so as to be easily viewable alongside any primary or secondary content that is shown on the display.

The element 700 comprises a first portion which shows a plurality of characters 710 present within the content, each of which may be selectable by a user by providing inputs to the element 700. A second portion of the element 700 is that of the information element 720 that displays information about the selected one of the characters 710. For example, the information element 720 may display a character name, player name, equipment information, team information, score, and/or status information of the selected character.

While discussed above primarily in terms of their visual appearance, it is consider that one or more AR elements may be provided that have audio components. For example, this may comprise simple notification sounds or the like that are operable to inform a user of an update to the display of the AR element or an update to the information that is displayed (such as a change in the score, or a new element appearing on the map).

In some embodiments, a more sophisticated audio action may be provided; for example, in the example of FIG. 7 each of the characters 710 may be configured to recite a catchphrase or the like upon selection or upon a change in their equipped items or the like. This may further improve user engagement with the AR content, while enabling an improved information provision to be performed.

In some embodiments, a more complete audio experience may be provided in conjunction with one or more of the AR elements. For example, a commentary of the action that is shown could be provided based upon what is being shown by that AR element (either in the sense of a traditional sports commentary, or a simpler recitation or announcement of events or the like that are shown). This can enable a user to experience the advantages of the AR element in providing more detailed information, without having to continuously view that particular AR element, for example.

Of course, numerous other possibilities for AR elements may be used in embodiments of the present invention. For example, one or more alternative views of the primary content may be provided to the viewer—these may be provided on virtual screens, for example, or in place of the primary content itself.

Any number of AR elements may be provided in combination with one another, and the display may be time-based or event-triggered rather than being entirely user-controlled or static over time. For example, a scoreboard-style AR element may be configured to only be shown when the score changes, while the map may zoom in dependence upon the elapsed time in a game.

Figure 8:
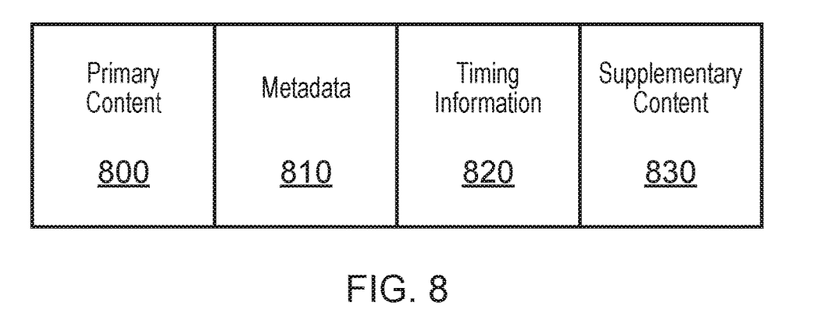
FIG. 8 schematically illustrates a data structure for the transmission of content.

FIG. 8 schematically illustrates an exemplary data structure for the transmission of content in line with embodiments of the present disclosure. This data structure may be suitable for the transmission of content via traditional broadcast methods, internet or network streaming, and/or transmission via removable storage media such as Blu-Ray® discs or external hard drive devices.

The data structure comprises primary content 800; this may be video content representing a game that is currently being played by a first user using a games console or server-based arrangement, for example. Alternatively, the primary content 800 may be video content representing a game that is not being played currently or is being played by players other than those present in the environment in which the AR elements are to be displayed. An example of such content is that of game highlights or replays, or esports content such as a tournament that is being broadcast. As noted above, while the primary content 800 may be VR or other immersive content to be displayed by an HMD, in some embodiments the primary content 800 may be a standard video stream that is to be displayed via a television or HMD.

The metadata 810 comprises information about the primary content 800. For example, this may comprise identifying information for the primary content 800 such as a title, genre, format, and/or content category, as well as more specific information about the elements within the content 800 such as teams/players shown, or in-game events.

Timing information 820 may also be provided alongside the primary content 800. This timing information may be advantageous in that a synchronisation between the primary content 800 and any displayed AR elements may be obtained. The timing information 820 may comprise a clock to be used by the AR content, or may comprise a list of events and their corresponding times to assist with synchronisation. For example, information shown in the AR elements may be updated according to the timing information 820.

Supplementary content 830 may comprise any content that is provided for the generation of AR elements. For example, information about preferred skins or display characteristics of the AR elements (so as to match the game theme, for example) may be provided. Alternatively, or in addition, information about which AR elements are compatible or preferred and/or what information should be displayed by the AR elements may also be provided using the supplementary content 830.

In some embodiments, the AR elements themselves may be provided in the supplementary content 830—after an initial download of the AR element, the supplementary content 830 may comprise only information used to update the display of the AR element, for example.

Figure 9:
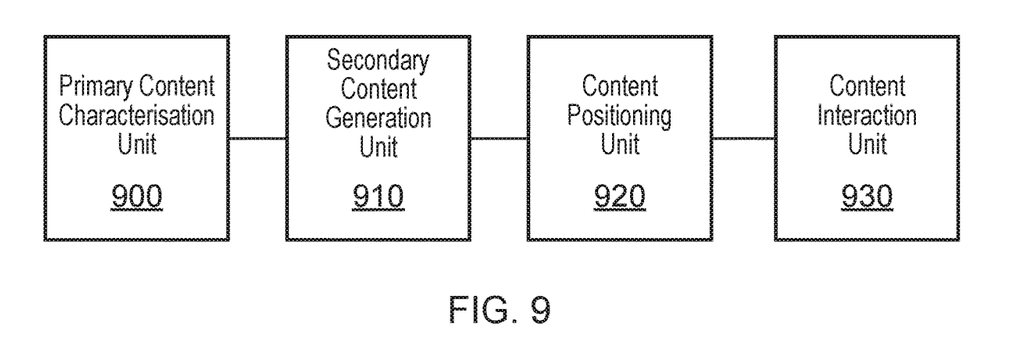
FIG. 9 schematically illustrates a system for generating secondary content for display.

FIG. 9 schematically illustrates a system for generating secondary content for display, the secondary content being augmented reality content corresponding to primary content for display by a first display device (such as the HMD 110 of FIG. 3, or any other suitable display device). For example, the system may be provided in a display arrangement in which the first display device is a head-mountable display device (HMD), and the secondary display device is a mobile phone or tablet computer.

The system comprises a primary content characterisation unit 900, a secondary content generation unit 910, a content positioning unit 920, and a content interaction unit 930. The system of FIG. 9 may be embodied by either or a combination of the server 410 or console 420 of FIG. 4; it should also be understood that one or more parts of the processing may be performed by the HMD 430 and/or AR display device 440.

The primary content characterisation unit 900 is operable to characterise the primary content. As discussed above, the primary content may comprise a video output corresponding to a user's gameplay, or a video stream of any suitable content (game content or otherwise).

In some embodiments, the primary content is virtual reality (VR) content, while in other embodiments the primary content may be any other two- or three-dimensional video content. In order to facilitate the characterisation, or other processing, the primary content may comprise one or both of timing information and information defining allowable secondary content elements. This timing information may comprise a content clock for the purpose of synchronisation between the primary and secondary content, or may comprise a list of events that occur within the primary content along with time stamps, for example.

The characterisation of the primary content may be performed in dependence upon metadata or supplementary data associated with the primary content, or in dependence upon image processing techniques or the like that may be performed upon the content.

This characterisation may be operable to identify any suitable information about the primary content—this may include any information relating to the events or participants within the content, or any of the elements that are shown, as well as information about the appropriate AR elements for use with that content and/or information to be shown in those AR elements.

The secondary content generation unit 910 is operable to generate, in dependence upon the characterisation of the primary content, secondary content comprising one or more secondary content elements associated with the primary content. As described above, these secondary content elements may be any suitable AR elements. In some embodiments, the secondary content comprises information not displayed by the first display device—for example, additional score information or other information about the content that is shown. The secondary content may also comprise a representation of the primary content, for example as a modified stream (such as two-dimensional rather than three-dimensional, or a different image quality) that can be overlaid in the environment.

It is considered that in a number of embodiments it may be advantageous that the primary and secondary content are to be displayed in synchronicity. For example, the AR/secondary content may be configured so as to comprise information about particular events within the primary content, and of course this information would be desired at the time at which the event occurs within the primary content. Such a feature may be facilitated by the provision of timing information alongside the primary content, for example, or may be enabled by reference to a standard clock or the like.

In some embodiments, the secondary content generation unit 910 is operable to generate one or more secondary content elements that comprise output audio. The output audio may be suitable for providing notifications to a user, for example, or supplementary information relating to the primary or secondary content.

The content positioning unit 920 is operable to position one or more secondary content elements with respect to one or more elements in a real environment, wherein the user of a second display device is able to view the secondary content elements overlaid upon a view of the real environment at the respective specified positions.

In some embodiments, the content positioning unit 920 is operable to display content at a position determined in dependence upon user inputs. These user inputs may be provided by the user of the first or second display devices, for example, enabling either or both users to contribute to the secondary content positioning process. In some examples, a user is able to use an input device in conjunction with the AR display device in order to control the positioning of the secondary content elements, while in others gesture-based inputs may be preferred. In one example, a user is able to use the AR display device directly as an input—for example, a drag and drop style positioning method may be implemented using a mobile phone or tablet as the AR display device, wherein the provisional secondary content element (or a representation of that element or its dimensions) is displayed overlaying a camera view of the environment to enable an intuitive placement method.

This positioning may be substantially automated in some embodiments, such that a number of candidate locations for the secondary content are identified (for example, using a camera that is operable to capture images of the real environment or by user input identifying the candidate locations) and the second content can be positioned in accordance with their individual requirements for display size, orientation, and/or aspect ratio or preferences (either from the content creator or the user) as to the arrangement of the second content elements (relative to one another or relative to the display of the first content, for example).

For instance, processing may be performed upon images captured of the environment by a camera associated with a games console so as to identify suitable display regions and their sizes (and any other characteristics, such as surface orientation or flatness); these identified characteristics may be stored or used for placement directly, or may be used to generate feedback information to a user to assist with their placement (such as by verifying the quality of a surface for the display of a secondary content element, or whether the size of the surface is suitable or the like).

The content positioning unit 920 may be operable to define the positions of the one or more secondary content elements such that two or more second display devices are operable to view the same secondary content elements at the same position. In order to do this, the position of the secondary content element should be defined using a shared coordinate system for the environment, for example, or the content positioning unit 920 may be operable to define the position of the one or more secondary content elements such that they are fixed to a specified object. For example, as discussed with reference to FIG. 6, the secondary content element could be defined so as to coincide with the table surface such that the element moves along with the table, and that any device that views the table is able to view the secondary content at that same position.

The content interaction unit 930 is operable to update the display of the secondary content in response to user inputs or events occurring within the primary content. This may comprise the updating of the information that is displayed, the selection of which secondary content elements to display, and/or the position or orientation of the secondary content element (or components thereof).

For example, this may enable a user to select which of the characters 710 in FIG. 7 to view information about, or may enable a user to rotate the map 600 shown in FIG. 6.

In some embodiments, this update is provided for each second display device independently such that each of the second display devices may show different elements and/or the same elements configured differently. Alternatively, the update of the display may be performed for the secondary content elements such that each of the second display devices views the content such that it occupies the same position/orientation within the environment.

Figure 10:
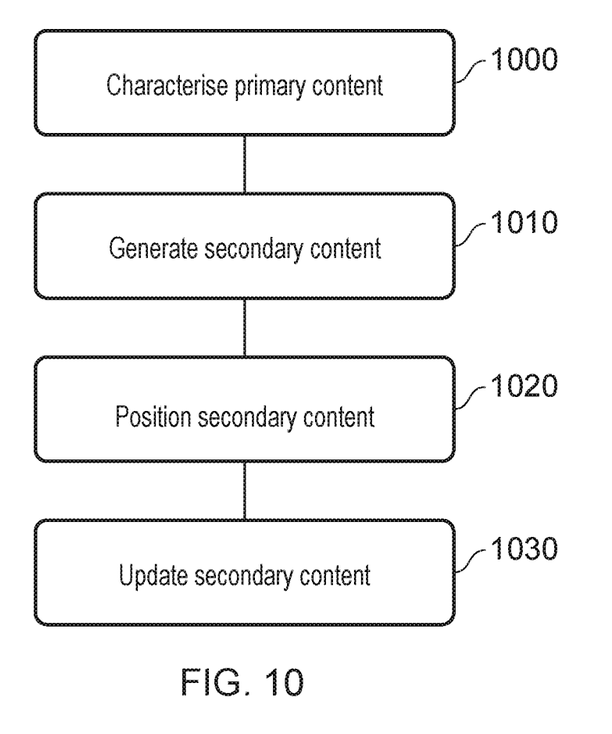
FIG. 10 schematically illustrates a method for generating secondary content for display.

The arrangement of FIG. 9 is an example of a processor (for example, a processor or processors located at any one or more of the devices shown in FIG. 4) that is operable to generate secondary content for display, the secondary content being augmented reality content corresponding to primary content for display by a first display device, and in particular is operable to:

characterise the primary content;
generate, in dependence upon the characterisation of the primary content, secondary content comprising one or more secondary content elements associated with the primary content; and
position one or more secondary content elements with respect to one or more elements in a real environment, wherein the user of a second display device is able to view the secondary content elements overlaid upon a view of the real environment at the respective specified positions FIG. 10 schematically illustrates a method for generating secondary content for display, the secondary content being augmented reality content corresponding to primary content for display by a first display device.

A step 1000 comprises characterising the primary content.

A step 1010 comprises generating, in dependence upon the characterisation of the primary content, secondary content comprising one or more secondary content elements associated with the primary content.

A step 1020 comprises positioning one or more secondary content elements with respect to one or more elements in a real environment, wherein the user of a second display device is able to view the secondary content elements overlaid upon a view of the real environment at the respective specified positions.

An optional step 1030 comprises updating the display of the secondary content in response to user inputs or events occurring within the primary content.

The techniques described above may be implemented in hardware, software or combinations of the two. In the case that a software-controlled data processing apparatus is employed to implement one or more features of the embodiments, it will be appreciated that such software, and a storage or transmission medium such as a non-transitory machine-readable storage medium by which such software is provided, are also considered as embodiments of the disclosure.

The invention claimed is:

1. A system for generating secondary content for display, the secondary content being augmented reality content corresponding to primary content for display by a first display device of a first user, the system comprising:
   a primary content characterisation unit operable to characterise the primary content, the primary content comprising at least one of gameplay, video stream, game content, and virtual reality (VR) content as controlled and viewed by the first user;
   a secondary content generation unit operable to generate, in dependence upon the characterisation of the primary content, secondary content comprising one or more secondary content elements associated with the primary content; and
   a content positioning unit operable to position one or more secondary content elements overlaid upon a view of a real environment as displayed by the second display device,
   wherein a second user of a second display device in the real environment is able to view the secondary content elements overlaid upon the view of the real environment at the respective specified positions as specified to the content positioning unit by at least one of the first user and the second user,
   wherein the first display device is a head-mountable display device worn by the first user, different than the second user of the second display device, and
   wherein the secondary content comprises information not displayed by the first display device.

2. The system of claim 1, wherein the primary content includes, for use by the primary content characterisation unit, at least one of timing information, allowable secondary content elements, metadata, images, information relating to events within the primary content, information relating to participants within the content, information related to appropriate augmented reality (AR) elements for use with the primary content, and information to be shown in the AR elements.

3. The system of claim 1, wherein the primary and secondary content are to be displayed in synchronicity.

4. The system of claim 1, wherein the secondary content comprises a representation of the primary content.

5. The system of claim 1, comprising a content interaction unit operable to update the display of the secondary content in response to user inputs or events occurring within the primary content.

6. The system of claim 1, wherein the primary content comprises one or both of timing information and information defining allowable secondary content elements.

7. The system of claim 1, wherein the content positioning unit is operable to define the positions of the one or more secondary content elements such that two or more second display devices are operable to view the same secondary content elements at the same position.

8. The system of claim 1, wherein the content positioning unit is operable to define the position of the one or more secondary content elements such that they are fixed to a specified object.

9. The system of claim 1, wherein the secondary content generation unit is operable to generate one or more secondary content elements that comprise output audio.

10. The system of claim 1, wherein at least one of:
   the secondary display device is a mobile phone or tablet computer; and
   the second user of the second display device is not able to view the primary content when the first user is viewing the primary content.

11. A method for generating secondary content for display, the secondary content being augmented reality content corresponding to primary content for display by a first display device of a first user, the method comprising:
- characterising the primary content, the primary content comprising at least one of gameplay, video stream, game content, and virtual reality (VR) content as controlled and viewed by the first user;
- generating, in dependence upon the characterisation of the primary content, secondary content comprising one or more secondary content elements associated with the primary content; and
- positioning one or more secondary content elements at specified positions overlaid upon a view of a real environment as displayed by a second display device as controlled and viewed by a second user, the specified positions being specified by at least one of the first user and the second user,
- wherein the second user of the second display device in the real environment is able to view the one or more secondary content elements overlaid upon the view of the real environment at the specified positions,
- wherein the first display device is a head-mountable display device worn by the first user, different than the second user of the second display device, and
- wherein the secondary content comprises information not displayed by the first display device.

12. The method of claim 11, wherein characterising the primary content includes analyzing at least one of timing information, allowable secondary content elements, metadata, images, information relating to events within the primary content, information relating to participants within the content, information related to appropriate augmented reality (AR) elements for use with the primary content, and information to be shown in the AR elements.

13. A non-transitory machine-readable storage medium which stores computer software, which when executed by a computer, causes the computer to perform a method for generating secondary content for display, the secondary content being augmented reality content corresponding to primary content for display by a first display device of a first user, by carrying out actions, comprising:
- characterizing the primary content, the primary content comprising at least one of gameplay, video stream, game content, and virtual reality (VR) content as controlled and viewed by the first user;
- generating, in dependence upon the characterization of the primary content, secondary content comprising one or more secondary content elements associated with the primary content; and
- positioning one or more secondary content elements at specified positions overlaid upon a view of a real environment as displayed by a second display device as controlled and viewed by a second user, the specified positions being specified by at least one of the first user and the second user,
- wherein the second user of the second display device in the real environment is able to view the one or more secondary content elements overlaid upon the view of the real environment at the specified positions,
- wherein the first display device is a head-mountable display device worn by the first user, different than the second user of the second display device, and
- wherein the secondary content comprises information not displayed by the first display device.

14. The storage medium of claim 13, wherein characterising the primary content includes analyzing at least one of timing information, allowable secondary content elements, metadata, images, information relating to events within the primary content, information relating to participants within the content, information related to appropriate augmented reality (AR) elements for use with the primary content, and information to be shown in the AR elements.

\* \* \* \* \*